March 27, 1951 — R. R. HEAD — 2,546,504

OBJECT HOLDING MECHANISM FOR GRINDING MACHINES

Filed Nov. 15, 1946 — 3 Sheets-Sheet 1

INVENTOR
Robert R. Head

March 27, 1951 R. R. HEAD 2,546,504
OBJECT HOLDING MECHANISM FOR GRINDING MACHINES
Filed Nov. 15, 1946 3 Sheets-Sheet 3
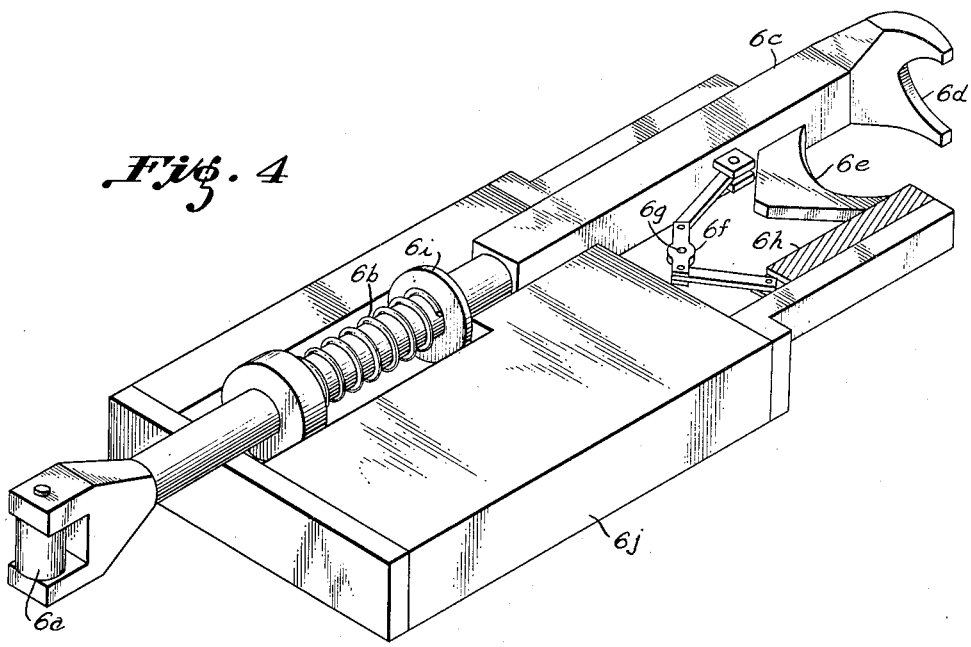
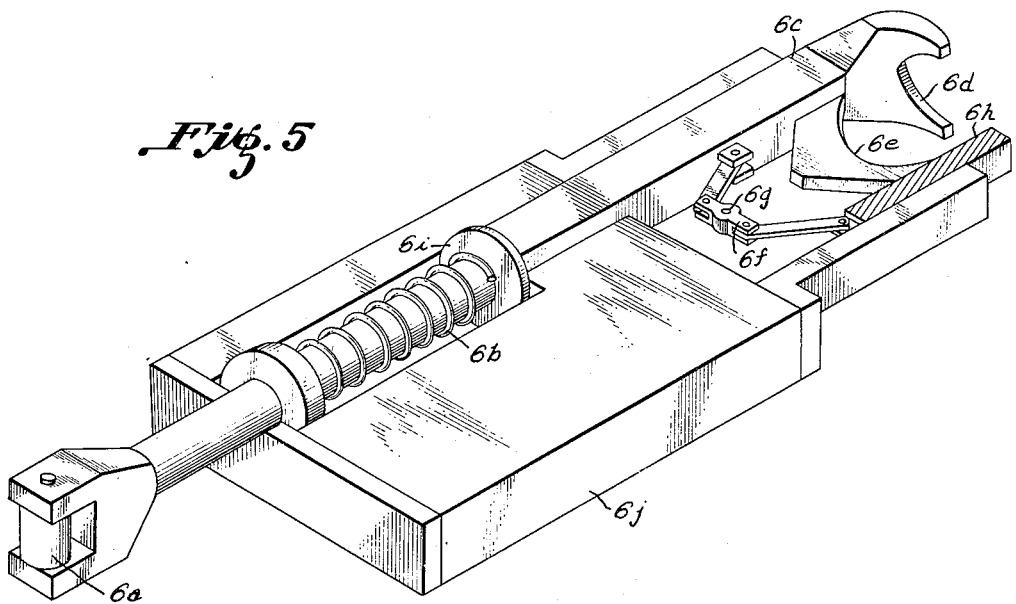
Inventor:
Robert R. Head Patented Mar. 27, 1951

2,546,504

UNITED STATES PATENT OFFICE 2,546,504

OBJECT HOLDING MECHANISM FOR GRINDING MACHINES

Robert R. Head, Boulder, Colo.

Application November 15, 1946, Serial No. 710,167

8 Claims. (Cl. 51—217)

This invention relates to object holding mechanisms for grinding machines, more particularly automatic grinding machines.

In the grinding of objects, such as fittings, the grinding operation or operations may be carried out automatically by feeding the objects, in turn, to a plurality of fitting holding mechanisms, mounted on a flywheel or the like, so as to be movable about a predetermined path. Such fitting holding mechanisms may comprise a pair of jaws, which are opened to grasp the object, and remain closed while the object is carried past one or more rotating grinding wheels, which engage the surfaces to be ground and reduce certain portions of the article to the desired dimensions. The object holding mechanisms may be associated with actuating means, such as a stationary cam mounted centrally with respect to the flywheel, but having eccentric portions which are adapted to move a cam follower inwardly and outwardly, the latter being connected with one or both jaws, to open and close the jaws at appropriate times. The objects, such as fittings, may be fed to the jaws either automatically or non-automatically, and when the jaws close on the object, the object is, of course, carried away from the feeding point. The jaws remain closed on the object until after grinding, whereupon the jaws may be opened by another eccentric portion of the cam, so that the object will be discharged. By mounting a plurality of holding mechanisms, as about the periphery of a flywheel, a large number of objects can be handled in a relatively short time. However, if any difficulty is experienced in the closing of the jaws on the objects, or in the feeding of the objects to the jaws, then the benefits of automatic operation are considerably reduced, due either to objects being missed by the jaws, or rejections for inaccurate grinding caused by inaccurate clamping of the object.

If the jaws are arranged so that the object must be fed radially between the jaws, the distance the object must travel in moving between the jaws is often too great to permit rotation of the holding mechanisms at more than a relatively slow speed, while if the jaws close radially, it is often difficult to move the jaws apart a sufficient distance to receive the object quickly, and also to discharge the object quickly. Furthermore, the object must be held very firmly during grinding, and one of the jaws is thus preferably stationary with respect to its support, i. e. the rotating flywheel or the like. When the movable jaw must open sufficiently to receive and discharge the object, the time consumed in the closing movement sometimes permits the object to drop or to become misaligned, or otherwise held inaccurately, as soon as it leaves the feeding point.

Among the objects of this invention are to provide a novel object holding mechanism for a grinding machine, particularly an automatic grinding machine; to provide such an object holding mechanism which is particularly adapted to carry small fittings or the like around from a feed point past one or more grinding wheels and then discharge the same; to provide such an object holding mechanism which will close quickly on the object, and thereby reduce to a minimum the possibility of the mechanism failing to grasp the object at the feeding point, or holding the object inaccurately; to provide such an object holding mechanism which is capable of both receiving and discharging the object relatively quickly, so that the grinding machine may be run at a sufficiently high speed to be economically desirable; to provide such an object holding mechanism which is quickly and surely actuated, as through a cam and cam follower; and to provide such an object holding mechanism which may be made in various sizes, or to accommodate various object shapes.

Additional objects and the novel features of this invention will become evident from the description which follows, taken in connection with the accompanying drawings, in which:

Fig. 4 is an isometric view of the object holding mechanism in open position, certain parts thereof being omitted and others being shown in section for clarity of illustration; and Fig. 5 is a similar isometric view of the object holding mechanism in closed position.

Figure 1:
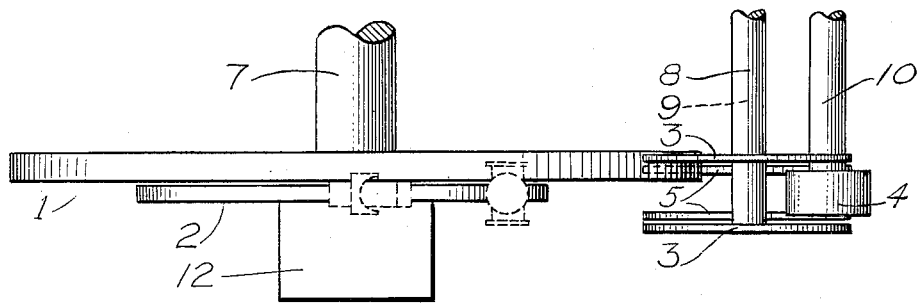
Fig. 1 is a top plan view of a grinding machine which may be provided with a plurality of object holding mechanisms constructed in accordance with this invention.
Figure 2:
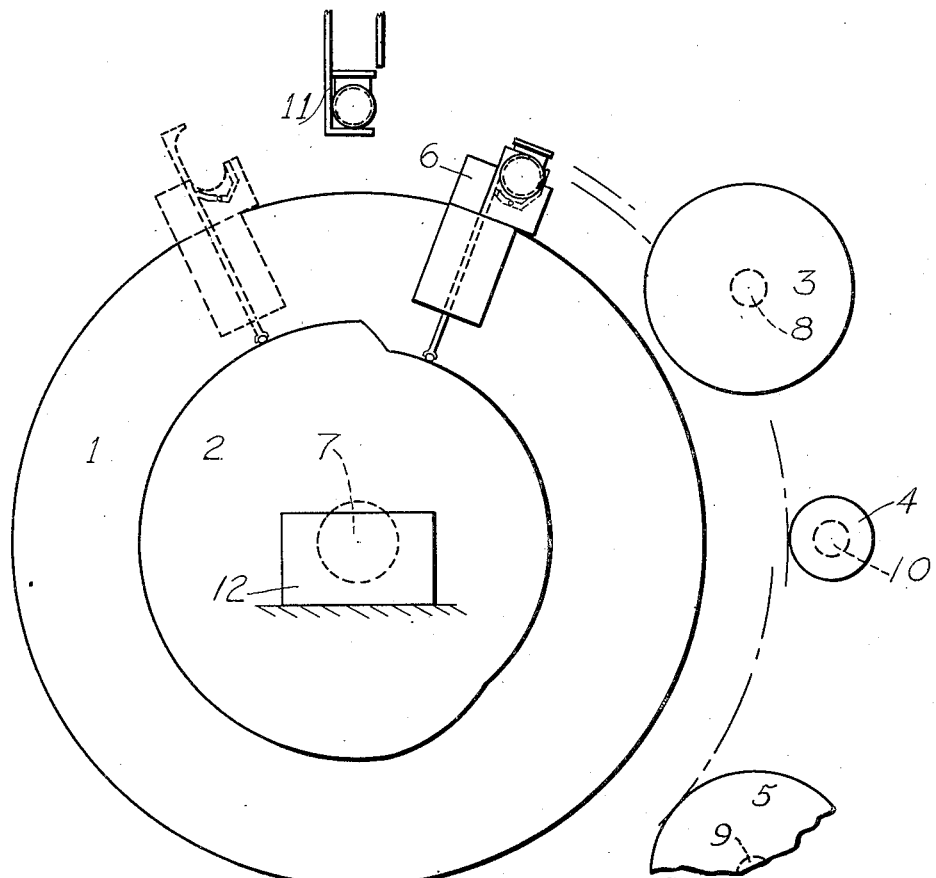
Fig. 2 is a side elevation of the grinding machine of Fig. 1.

As illustrated in Figs. 1 and 2 of the drawings, a plurality of object holding mechanisms of this invention may form a part of grinding mechanism which includes a flywheel 1 mounted on and rotated by a shaft 7. A stationary cam 2 is mounted alongside the flywheel 1, as on a support 12, so as to actuate a plurality of object holding mechanisms 6, such as four in number (only one being shown in Fig. 2), which are bolted or otherwise secured to the flywheel 1. The flywheel 1 is preferably rotated at a constant speed, and the configuration of cam 2 is such that, when an object holding mechanism 6 is in the dotted position of Fig. 2, it will be open and adapted to receive an object to be ground, such as a fitting, from a feed device 11. The holding mechanism 6 then closes on the fitting, as it passes the fall at the top of cam 2, and carries it away from the feed device 11, as to the full position of Fig. 2. The fitting is then carried around past suitable grinding devices, such as emery wheels 3, 4 and 5, respectively, after which the holding mechanism 6 is opened by the rise at the bottom of cam 2, and the ground fitting is discharged, as by centrifugal force, or a combination of gravity and centrifugal force. The grinding devices may be disposed in positions suitable for the object being ground, such as a pair of emery wheels 3 mounted on a shaft 8, a pair of emery wheels 5 mounted on a shaft 9, and a single emery wheel 4 mounted on a shaft 10. The shafts 8, 9 and 10, as well as the flywheel shaft 7, may be driven at suitable speeds by a motor, or pulley and belt arrangements or the like, which, along with the means for supporting the shafts 7, 8, 9 and 10 for rotation, may be conventional and therefore are not shown.

Figure 3:
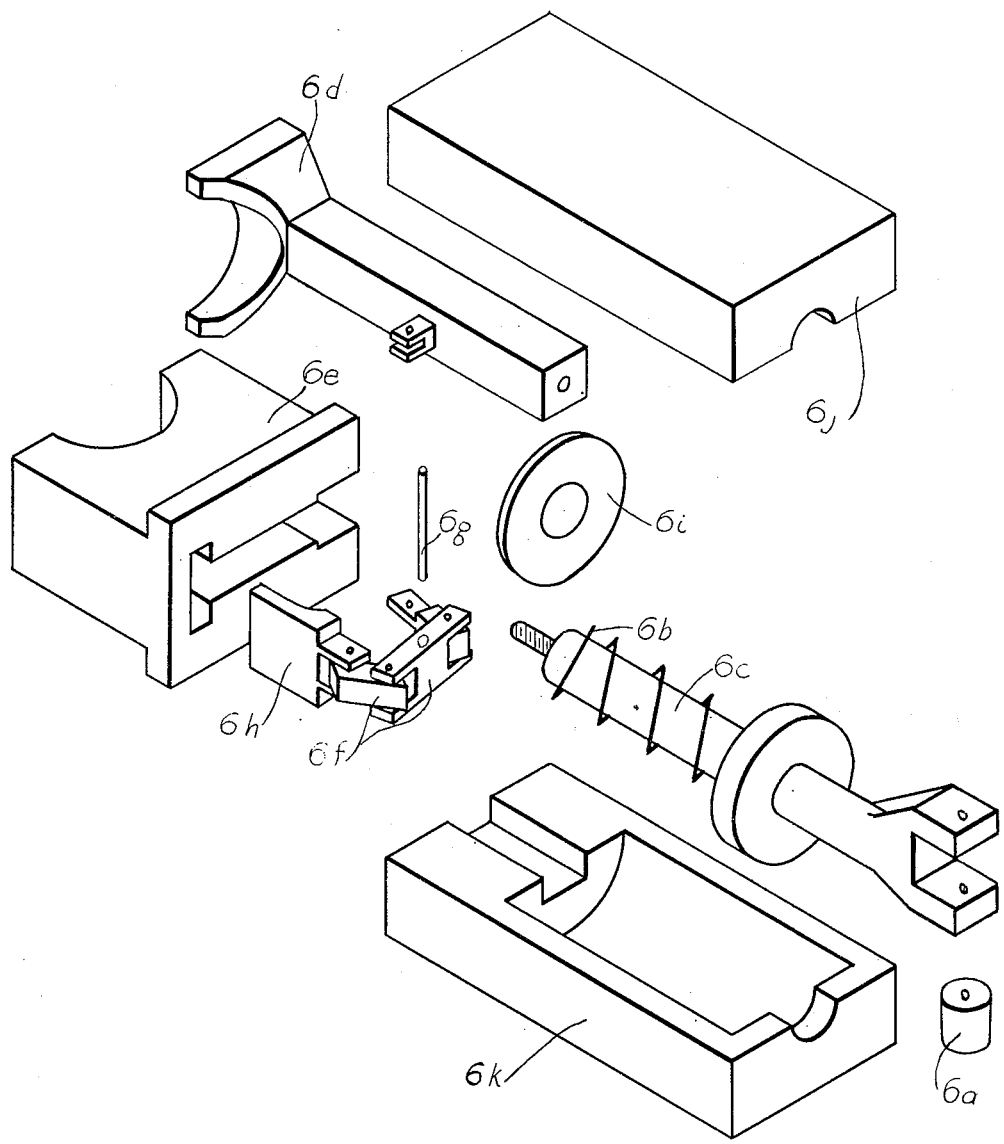
Fig. 3 is an exploded isometric view of the object holding mechanism.

As illustrated more clearly in Figs. 3, 4 and 5, the object holding mechanism 6 constructed in accordance with this invention may comprise a movable jaw 6d, a stationary jaw 6e, and a fitting supporter or auxiliary jaw 6h. Where the fitting or other object to be held has a portion of circular cross section, the stationary jaw 6e may have a corresponding contour, while the movable jaw 6d may be fork shaped, and also provided with a contour similar to the portion of the object engaged thereby. In the embodiment shown, the movable jaw 6d is adapted to be moved radially inwardly toward the fixed jaw, but other directions of relative movement between the two jaws may be utilized. Also, all of the relative movement between the two jaws is not necessarily that of one jaw only.

When the holding mechanism 6 approaches the feed device 11, it is necessary for the two jaws to be positioned so that there is sufficient space therebetween for the object to enter, after which the jaws may be closed on the object. If the closing movement of the jaws is laterally, i. e. tangential to the periphery of the flywheel 1, it would be necessary for the feed device to push the object into position between the jaws. However, with the relative movement of the two jaws in a radial direction, i. e. when a movable jaw is moved radially inwardly, the holding mechanism may merely, as it were, pluck the fitting from the feed device. Since the peripheral speed of the flywheel 1 has to be sufficient to enable a relatively large number of objects to be ground within a sufficiently short period of time that automatic operation of the grinding mechanism will be rapid enough to be economical, the time interval in which the holding mechanism must grasp the object, as it leaves the feed device, is comparatively short. Due to the inertia of moving parts, there is a limitation upon the distance which a movable jaw can move in closing upon an object, unless the jaw is closed by relatively heavy springs, or the like, but the latter increases the difficulty with which the jaw can be moved to open position, and thereby increases the difficulties in adequately discharging the object after grinding, not to mention the possibility of undue wear on cams, cam rollers or cam followers and the like, due to exceedingly heavy spring pressure.

In accordance with the present invention, the relative distance which the two jaws are required to move, for closing upon an object, and also discharging the same, is materially reduced by the fitting supporter or auxiliary jaw 6h. This auxiliary jaw 6h, as in Figs. 3, 4 and 5, is preferably mounted for sliding movement in the fixed jaw 6e, although other positions and arrangements of the same are possible. In addition, the supporter or auxiliary jaw 6h is actuated simultaneously with actuation of the movable jaw 6d, as by a lever system 6f, which connects the auxiliary jaw 6h with a bar or rod 6c, on the outer end of which the movable jaw 6d is mounted. The lever system 6f may be pivoted on a pin 6g, which extends through suitable holes, provided for the purpose in fixed jaw 6e, or in any other desired portion of the holding mechanism. Fixed jaw 6e may also be provided with a longitudinal slot to accommodate supporter 6h and a lateral slot to accommodate lever system 6f. As will be evident, when the movable jaw 6d is in extended or open position, as in Fig. 4, the fitting supporter or auxiliary jaw 6h is retracted within the stationary jaw 6e. Thus, the supporter or auxiliary jaw 6h enlarges the space between the jaws for ingress or egress of the object, both when the jaws are opened to receive the object and when the jaws are opened to discharge the object. Again, when the movable jaw 6d is in retracted or closed position, as in Fig. 5, the fitting supporter or auxiliary jaw 6h is in extended position, closing the gap between the end of the movable jaw 6d and the stationary jaw 6e, so that the fitting will be held securely by the jaws, and will not tend to be dislodged therefrom, during movement past the grinding wheels.

The jaws 6d and 6e may be mounted in or on the two halves 6k and 6j of the base or jaw support of the holding mechanism, each half of the base being provided with a suitable groove or aperture to accommodate the rod 6c, and also a spring 6b and collar or washer 6i associated therewith. The two halves of the base may be bolted or otherwise secured together, and also bolted or otherwise secured to the flywheel 1. The outer portion of the rod or bar 6c may be rectangular in cross section, so as to maintain the movable jaw 6d in alignment, while the bar 6c is moved back and forth in the slot. The inner portion of the rod 6c may be round, and the inner end provided with a fork which carries a cam engaging roller 6a. Spring 6b, which surrounds the inner portion of the rod 6c and bears at one end against a shoulder formed on the rod, which also acts as a stop to limit inward movement of rod 6c, bears at the opposite end against a washer 6i, which holds the cam roller 6a against the cam at all times, and also holds the movable jaw 6d in closed position. However, since the auxiliary jaw 6h cooperates with the jaws 6d and 6e in holding the object, the spring 6b need not be nearly as strong as if it were depended upon to close the jaw 6d with considerable rapidity.

As will be evident, the object holding mechanism of this invention fulfills to a marked degree the requirements and objects hereinbefore set forth. The use of a fitting supporter or auxiliary jaw, which is movable relatively with respect to at least one of the jaws, and in a direction opposite to that of the opposite jaw, enables the jaws to close quickly and securely upon the object, and assists in securely holding the object during the grinding operation. As indicated previously, while the auxiliary jaw is shown as being movable with respect to a stationary jaw, it will be understood that each of the principal jaws may be moved, and also that the fitting supporter or auxiliary jaw may be actuated in a manner other than by a linkage mechanism from a movable jaw. Thus, while the actuation of the auxiliary jaw from the movable jaw is highly desirable, in some instances it may be desired to actuate the auxiliary jaw independently of the movable jaw, as by its own cam and lever, but in many instances, a construction operating similarly to the preferred embodiment will be more desirable.

It will be understood, of course, that objects having different shapes from the fittings shown herein may be ground by the use of object holding mechanism constructed in accordance with this invention, and that the size, as well as the shape and configuration of such objects, may vary considerably. Also, while a preferred embodiment of this invention has been illustrated and described, it will be understood that other embodiments may exist, and that various changes may be made, all without departing from the spirit and scope of this invention.

What is claimed is:

1. An object holding mechanism for grinding operations, comprising a support capable of being attached to another element; a stationary jaw attached to said support; a movable jaw element consisting of a fitting holding jaw, an attached rod element enclosed in said support, a cam follower, a resilient element holding said movable jaw closed, and a stop means limiting the position of the movable jaw element in its nominal or closed position; and an object supporter supported by said stationary jaw and actuated by the motion of the movable jaw through a link element, said link element consisting of three links and rods and attached to said movable jaw and said supporter.

2. An object holding mechanism for a grinding machine having a rotating flywheel and a stationary cam, comprising a support capable of being attached to said flywheel and formed in two halves; an inner stationary jaw attached to said support and having a guideway therein and a portion contoured to the object to be held; an outer movable jaw also having a portion contoured to the object to be held and movable radially with respect to said flywheel and thereby movable inwardly and outwardly with respect to said stationary jaw; a rod element carrying at its outer end said movable jaw, and at its inner end a cam follower, said rod having a stop and said support halves having grooves to accommodate said rod; a spring and bearing washer surrounding said rod in said grooves, said spring bearing at one end against said stop and at the opposite end against said washer, said spring tending to hold said movable jaw closed; an auxiliary jaw slidably mounted in said stationary jaw for extension therefrom and retraction thereinto; and a link element consisting of three links and rods and attached at one end to said movable jaw rod and at the other end to said auxiliary jaw, whereby said auxiliary jaw will enlarge the space between said jaws available for the ingress or egress of an object when said jaws are opened to receive said object and also when said jaws are opened to discharge said object, said auxiliary jaw also being adapted to engage said object to hold said object between said jaws when said jaws are closed.

3. An object holding mechanism for a grinding machine, wherein a plurality of objects to be ground are fed to a holding mechanism adapted to grasp each such object in turn, move said object past grinding means, and then discharge said object, said object holding mechanism being moved along a path intersecting an object to be grasped, which comprises the combination of a pair of jaws, movable relatively to each other, and adapted to grasp an object therebetween when in closed position, said jaws leaving a gap between the ends thereof when in closed position and a wider gap when in open position, said wider gap facing in the general direction of movement of said holding mechanism so that an object will enter through said wider gap; an object supporter movable relatively to at least one of said jaws and between extended and retracted positions, said supporter in extended position engaging said object at said gap with said jaws in closed position; means supporting said jaws and said object supporter in operative position; means operatively connected to at least one of said jaws for moving at least one of said jaws relative to the other jaw, so as to open and close said jaws; and means operatively connected to said supporter for substantially simultaneously moving said supporter to extended position when said jaws are closed and to retracted position when said jaws are open, so as to enlarge the space between said jaws available for the ingress or egress of an object when said jaws are open.

4. An object holding mechanism for a grinding machine, as defined in claim 3, wherein said object supporter is mounted for extension and retraction on one of said jaws.

5. An object holding mechanism for a grinding machine, as defined in claim 3, wherein said object supporter is mounted for sliding movement on one of said jaws.

6. An object holding mechanism for a grinding machine wherein a plurality of objects to be ground are fed to a holding mechanism adapted to grasp each such object in turn, move said object past grinding means, and then discharge said object, said object holding mechanism being moved along a path intersecting an object to be grasped, which comprises the combination of a first and second jaw, movable relatively to each other in a direction transverse to the direction of movement of said holding mechanism, and adapted to grasp an object therebetween when in closed position, said jaws leaving a gap between the ends thereof when in closed position and a wider gap when in open position, said wider gap facing in the general direction of movement of said holding mechanism so that an object will enter through said wider gap; an object supporter movable relatively to said first jaw between extended and retracted positions, said supporter in extended position engaging said object at said gap with said jaws in closed position; means supporting said jaws and said object supporter in operative position; means operatively connected thereto for moving said second jaw relative to said first jaw, so as to open and close said jaws; and means operatively connected to said supporter for substantially simultaneously moving said supporter with respect to said first jaw to extended position when said jaws are closed and to retracted position when said jaws are open.

7. An object holding mechanism, for a grinding machine wherein a plurality of objects to be ground are fed to a holding mechanism adapted to grasp each such object in turn, move said object past grinding means, and then discharge said object, said object holding mechanism being moved along a path intersecting an object to be grasped, which comprises the combination of a pair of jaws, movable relatively to each other in a direction transverse to the direction of movement of said holding mechanism, and adapted to grasp an object therebetween when in closed position, said jaws leaving a gap between the ends thereof when in closed position and a wider gap when in open position, said wider gap facing in the general direction of movement of said holding mechanism so that an object will enter through said wider gap; means supporting said jaws in operative position; an object supporter mounted on one of said jaws and movable relatively thereto between extended and retracted positions, said supporter in extended position engaging said object at said gap with said jaws in closed position; means operatively connected thereto for moving at least one of said jaws relative to the other jaw, so as to open and close said jaws; and means operatively connected to said supporter and actuated by said jaw moving means for substantially simultaneously moving said supporter with respect to the jaw on which said supporter is mounted, to extended position when said jaws are closed and to retracted position when said jaws are open.

8. An object holding mechanism, for a grinding machine wherein a plurality of objects to be ground are fed to a holding mechanism adapted to grasp each such object in turn, move said object past grinding means, and then discharge said object; said grinding machine including a plurality of holding mechanisms and means for actuating the same and for moving the same along a path intersecting successive objects to be grasped, such object holding mechanism comprising the combination of an inner jaw, an outer jaw and an object supporter; means supporting said jaws and said object supporter in operative position to receive, to hold, and to release an object to be ground, said inner jaw being stationary with respect to said supporting means; said outer jaw being movable inwardly and outwardly with respect to said inner jaw, said jaws being adapted to grasp an object therebetween when in closed position, said jaws leaving a gap between the ends thereof when in closed position and a wider gap when in open position, said wider gap facing in the general direction of movement of said holding mechanism so that an object will enter through said wider gap; said object supporter being movable inwardly and outwardly with respect to said supporting means, between an extended position in which said supporter tends to close said gap and also to engage an object at said gap, and a retracted position in which said supporter extends outwardly for substantially no greater distance than said inner stationary jaw; means operatively connected to said outer jaw for moving said outer jaw relative to said inner jaw, so as to open said jaws at the point of discharge of an object and close said jaws upon an object when said object enters said wider gap; and means operatively connected to said object supporter for substantially simultaneously moving said supporter inwardly when said outer jaw is moved outwardly, and moving said supporter outwardly when said outer jaw is moved inwardly, so as to enlarge the space between said jaws available for the ingress or egress of an object.

ROBERT R. HEAD.

REFERENCES CITED

The following references are of record in the file of this patent:

UNITED STATES PATENTS

| Number | Name | Date |
| --- | --- | --- |
| 336,118 | King | Feb. 16, 1886 |
| 559,842 | Buckland | May 12, 1896 |
| 638,835 | Coran | Dec. 12, 1899 |
| 726,972 | McCollister | May 5, 1903 |
| 766,403 | Vincke | Aug. 21, 1904 |
| 826,694 | Shirley | July 24, 1906 |
| 1,053,631 | Mulholland | Feb. 18, 1913 |
| 1,261,432 | Parslow | Apr. 2, 1918 |
| 1,387,936 | Page | Aug. 16, 1921 |
| 1,393,668 | Cummings | Oct. 11, 1921 |
| 1,482,272 | Smith | Jan. 29, 1924 |
| 1,593,825 | Higgins | July 27, 1926 |
| 1,634,040 | Parenti et al. | June 28, 1927 |
| 1,637,490 | Lorenz et al. | Aug. 2, 1927 |
| 1,651,382 | Gardner et al. | Dec. 6, 1927 |
| 1,802,973 | Gardner | Apr. 28, 1931 |
| 1,856,427 | Pratt | May 3, 1932 |
| 1,862,704 | Prouty et al. | June 14, 1932 |
| 1,906,877 | Trotter | May 2, 1933 |
| 1,932,893 | Herckelbout | Oct. 31, 1933 |
| 1,975,051 | Peiler | Sept. 25, 1934 |
| 2,112,118 | Rowe | Mar. 22, 1938 |
| 2,337,528 | Stuckert | Oct. 23, 1941 |
| 2,349,638 | Schreiber | May 23, 1944 |
| 2,352,551 | Kende et al. | June 27, 1944 |
| 2,424,835 | Luckey et al. | July 29, 1947 |
| 2,429,801 | Butler | Oct. 28, 1947 |